(12) United States Patent
Hilscher et al.

(10) Patent No.: US 7,160,012 B2
(45) Date of Patent: Jan. 9, 2007

(54) LAMP

(75) Inventors: Achim Hilscher, Friedberg-Stätzling (DE); Harald Hofmann, Lüdenscheid (DE); Thomas Noll, Kipfenberg (DE); Martin Zachau, Geltendorf (DE)

(73) Assignee: Patent-Treuhand-Gesellschaft für elektrische Glëhlapen mbH, Munich (DE)

( * ) Notice: Subject to any disclaimer, the term of this patent is extended or adjusted under 35 U.S.C. 154(b) by 8 days.

(21) Appl. No.: 10/500,828

(22) PCT Filed: Jan. 3, 2003

(86) PCT No.: PCT/DE03/00007

§ 371 (c)(1),
(2), (4) Date: Jul. 7, 2004

(87) PCT Pub. No.: WO03/059012

PCT Pub. Date: Jul. 17, 2003

(65) Prior Publication Data

US 2005/0105302 A1    May 19, 2005

(30) Foreign Application Priority Data

Jan. 7, 2002    (DE) ............................... 102 00 304

(51) Int. Cl.
*F21Y 101/02*    (2006.01)
(52) U.S. Cl. .................. 362/555; 362/84; 362/216; 362/235; 362/260; 362/560; 362/580; 362/613

(58) Field of Classification Search ................ 362/216, 362/217, 560, 580, 551, 555, 84, 260, 31, 362/600, 235, 613, 800
See application file for complete search history.

(56) References Cited

U.S. PATENT DOCUMENTS

| 5,581,683 | A | 12/1996 | Koens et al. |
| 6,481,882 | B1 * | 11/2002 | Pojar .......................... 362/559 |
| 6,497,496 | B1 * | 12/2002 | Wang .......................... 362/249 |
| 6,874,924 | B1 * | 4/2005 | Hulse et al. ................ 362/551 |
| 2001/0048603 | A1 | 12/2001 | Ohuchi |

FOREIGN PATENT DOCUMENTS

| DE | 198 29 270 A | 1/1999 |
| EP | 0 876 085 A | 11/1998 |
| EP | 0 978 683 A | 2/2000 |
| FR | 2 571 728 A | 4/1986 |
| GB | 2 282 877 A | 4/1995 |
| JP | 11 306824 A | 11/1999 |
| WO | WO 02/097324 | 12/2002 |

* cited by examiner

*Primary Examiner*—Laura K. Tso
(74) *Attorney, Agent, or Firm*—Cohen, Pontani, Lieberman & Pavane

(57) ABSTRACT

A lamp (10) is disclosed with a single or double-sided socket, whereby a bulb element (11) is arranged on the at least one socket (12), which surrounds a volume of space (14) and said lamp is provided with at least one LED element (13). An irradiation of the LED light into the bulb element occurs and, as a result of reflection, in particular total reflection, on the defining surfaces (16,17) of the bulb element a transmission of the LED light within the bulb element occurs.

20 Claims, 3 Drawing Sheets

LAMP

This is a U.S. national stage of International Application No. PCT/DE03/00007, filed on 3 Jan. 2003.

FIELD OF THE INVENTION

The invention relates to a lamp, which has a base at one or two ends and comprises a bulb element, which is arranged on the at least one base and essentially envelops a physical volume. The lamp has at least one associated LED element (light-emitting diode).

BACKGROUND OF THE INVENTION

Such a lamp is disclosed in DE 198 29 270 A1. The lamp as described there comprises at least two lamp elements having a different color temperature, it being possible to vary the overall color temperature of the lamp. One of the lamp elements is in the form of an LED.

When arranging LEDs in a lamp, account must be taken of the fact the LEDs generally emit directed light. A particular arrangement of the LED elements is required to achieve a homogeneous luminance distribution of the LED light emitted by the lamp. The aim is to largely prevent resolution in light-source structures for a viewer. Furthermore, in the case of a lamp having two lamp elements having a different color temperature, problems associated with shadowing are particularly prevalent.

SUMMARY OF THE INVENTION

One object of the invention is to provide a lamp having at least one LED element such that homogeneous luminance distribution of the LED light emitted by the lamp is achieved.

This and other objects are attained in accordance with one aspect of the invention directed to a lamp having a base at one or two ends. A bulb element which essentially envelops a physical volume is arranged on the base, and the lamp has at least one associated LED element, characterized in the LED light is irradiated into the bulb element, and, owing to reflection, in particular total reflection, at the limit faces of the bulb element, the LED light is passed on within the bulb element.

A feature in one embodiment of the invention involves injecting light emitted by one or more LED elements directly into the bulb element, and using the bulb element as a light-guiding and/or light-deflecting element. It is thus possible for LED light to be supplied largely uniformly over the entire bulb element or for LED light to flow through the entire bulb element. The arrangement and formation of corresponding limit faces and the use of a correspondingly selected shape for the bulb element can ensure that the LED light emerges largely uniformly from the bulb element and leaves the lamp in this manner.

According to the invention, resolution in light-source structures can be avoided. In addition, in particular for the case in which a lamp element of the second type is arranged within the physical volume, an overall light distribution can be achieved, which is generated jointly by the at least one LED element and the lamp element of the second type and which does not present any problems associated with shadowing. The LED element and the lamp element of the second type advantageously generate an identical luminance distribution.

In an alternative refinement of the invention, a lamp element of the second type may, of course, also be arranged outside the physical volume. In this refinement, the bulb element is positioned, for example, between two limbs of lamp elements of the second type, which makes possible, for example, even a rotationally symmetrical arrangement, in any case a homogeneous overall light distribution without presenting any problems associated with shadowing.

In the case of the lamp according to the invention, it is possible for the bulb element to have exclusively curved limit faces, i.e. ones having largely no edges, which makes possible a predominantly continuous path for the luminous intensity distribution.

LED light is generally understood to mean the electromagnetic radiation emitted by an LED element in the visible wavelength range. However, in the sense of the present invention, the term LED light also includes radiation emitted by the LED element in the non-visible wavelength range, for example also includes UV radiation.

The formulation which envisages that the bulb element essentially envelops a physical volume naturally also includes exemplary embodiments which have openings in the bulb element. For example, these openings may be ventilation openings which allow a cooling flow of air to pass through the bulb element. For the case in which such openings in the bulb element are provided, particular further measures can be provided for passing the LED light on within the bulb element.

The bulb element per se is known and is in common usage in the case of lamps of the prior art. In the prior art, the bulb element principally serves the purpose, for example, of retaining a specific gas in a physical volume. On the other hand, fixedly connecting the bulb element to the at least one base produces an enclosed cavity, in which another pressure prevails than that which is outside the lamp. In addition to this function, it is also already known in the prior art to use a bulb element as a diffuser.

According to the invention, the bulb element is now also given the function of a fiberoptic conductor for the light emitted by the at least one LED element. This makes it possible to guide the LED luminous flux in a targeted manner such that virtually all of the outer limit face of the bulb element can act as a light exit surface to allow the LED light to emerge from the bulb element in a largely uniform manner.

The conventional, known functions of the bulb element in the sense of a diffuser or in the sense of a pressure chamber wall or gas chamber wall need not be dispensed with here but may also be included, if desired.

It is advantageous in this context if, in accordance with a refinement of the invention, the physical volume is completely enclosed jointly by the bulb element and the at least one base. In this manner, it is possible for another pressure to prevail within the physical volume than prevails outside the lamp, and/or for the physical volume to be filled with a gas.

According to a further advantageous refinement of the invention, the at least one LED element is arranged in the at least one base of the lamp. This provides a particularly simple way of accommodating the LED element.

According to a further advantageous refinement of the invention, two or more LED elements are arranged in the region of the edge of the base. This also provides a simple way of accommodating the LED elements. This arrangement is also favorable in terms of temperature distribution, particularly when a lamp element of the second type is arranged in the lamp. In particular, this makes it possible to operate different lamp elements at the same time with the temperature of the lamp element being at most only slightly influenced by each other.

The base of an LED element is heated to a comparatively great extent. In particular in the case of a lamp element of the second type in the form of a compact fluorescent lamp, comparatively high temperatures likewise result in the region where this lamp element is connected to the base. Arranging the LED element or the LED elements in the region of the outer edge of the base and arranging the lamp element of the second type approximately centrally on the base of the lamp produces a maximum spacing between the region where the LED elements are arranged and the region where the lamp element of the second type is connected. By means of this large spacing, a maximum reduction can be achieved in the extent to which the lamp elements influence each other's temperature, making parallel operation of the two lamp elements possible. Heat dissipation of the heat generated by the LED elements on the outer side of the base can take place almost without the compact fluorescent lamp having a disruptive effect.

According to a further advantageous refinement of the invention, the at least one LED element is arranged on the at least one base close to the region where the bulb element is fixed. This may result in the LED light emitted by the at least one LED element being injected directly into the bulb element with virtually no losses.

According to a further advantageous refinement of the invention, a lamp element of the second type is arranged in the physical volume. This makes possible the design in which the lamp has two lamp elements having a different color temperature, as is described in DE 198 29 270 A1. In particular, it is possible to provide the LED elements as lamp elements of the first type having a first color temperature, and to arrange at least one lamp element of the second type having another color temperature in the enveloped physical volume. In this case, it may advantageously be possible for the two lamp elements or groups of lamp elements to be designed such that they can be dimmed and/or connected or disconnected.

In particular, provision may be made for the lamp element of the second type to be in the form of an Hg fluorescent lamp. Combining such Hg fluorescent lamps with preferably two or more red LED elements in this case also makes it possible to generate white light having color temperatures of less than 2,500 K, i.e. light such as is also generated when a conventional incandescent lamp is dimmed.

Such Hg fluorescent lamps may have any desired shape and be in the form of a compact lamp or a linear lamp, for example. In particular, compact fluorescent lamps may be provided, whose discharge vessel comprises at least one piece which is bent in particular in the form of a U, such as, for example, DULUX-T/E compact fluorescent lamps and DULUX-S/E lamps or DULUX L lamps by OSRAM.

According to a further refinement of the invention, two or more LED elements are provided which are arranged on the base such that they are distributed in the circumferential direction. This makes it possible to achieve high light output for the light emitted by the LED, since many LED elements can be arranged such that they are comparatively tightly packed together.

The number of LED elements is in practice only limited by the dimensions of the base. However, by arranging two or more LED elements essentially in the form of a circular ring, a particularly dense arrangement can be selected, making it possible for a high luminous flux of LED light to be injected into the bulb element.

According to a further advantageous refinement of the invention, the LED elements comprise different colors. Colored operation can be achieved in this way, for example, by selectively dimming the LED elements.

According to a further advantageous refinement of the invention, in addition to the at least one LED element, lamp elements of the second type are provided which have essentially the same color temperature as the LED element. Such a combination is expedient, for example, for generating an efficient emergency light or continuous light having a low light output, and, if necessary, for additionally connecting the lamp element of the second type, for example in the form of a compact fluorescent lamp, in order to generate a high luminous flux.

According to a further advantageous refinement of the invention, the bulb element has an inner limit face which is adjacent to the physical volume and an outer limit face which is adjacent to the exterior, the inner and the outer limit faces being at least partially curved. This refinement makes possible bulb elements having largely no edges, making it possible, in principle, to create a uniform light exit surface for the bulb element.

The LED light is passed on within the bulb element along the limit faces largely owing to total reflection on the two limit faces. Light is caused to emerge from the bulb element essentially owing to imperfections or owing to the surface being worked in a corresponding manner, for example roughened, or owing to a special coating for the limit faces. Providing the bulb element with a particular shape or forming or working the limit faces can ensure that imperfections are generated on the limit faces such that in each case some of the LED light passed on within the bulb element on its way through the bulb element is diffused at the imperfections and emerges from the bulb element, but the much more of the LED light is passed on within the bulb element.

It could be envisaged, for example, to provide imperfections, which increase as they get further away from the LED element. Alternatively, a corresponding light distribution could also be achieved owing to the surfaces of the outer limit face being worked to a differing extent depending on the spacing from the LED element.

According to a further advantageous refinement of the invention, a diffuser element is provided in addition to the bulb element. The diffuser element may in this case likewise be in the form of a bulb and envelop the bulb element, for example. Such a diffuser element contributes to further homogenizing the LED light.

According to an advantageous refinement of the invention, the bulb element is solid and has an essentially constant wall thickness between the inner and the outer limit faces. The imperfections may in this case be arranged in the bulb element itself, for example by introducing specific impurities, or by forming notches.

Alternatively, provision is made to vary the wall thickness of the bulb element, in particular as a function of the spacing from the LED elements.

According to a further advantageous refinement of the invention, the bulb element is hollow overall, two separate structural elements forming the inner limit face and the outer limit face, and total reflection taking place on the inner and on the outer limit faces. There may be a vacuum or a gas filling between the two limit faces.

According to an advantageous refinement of the invention, the inner and/or outer limit face of the bulb element is provided with a fluorescent layer which is stimulated by the LED light, in particular by LED radiation which is in the short-wave UV range.

According to a further advantageous refinement of the invention, the lamp has at least one base having a conventional physical shape, as described in DE 198 29 270 A1. It is advantageous in particular when connecting the lamp according to the invention to conventional luminaires.

According to an advantageous refinement of the invention, the bulb element is made of plastic. This refinement makes it possible for diffusers to be introduced into a plastic granulate composition, from which the bulb element is produced. The bulb element which is in particular manufactured as a plastic injection-molded part may thus be provided with particularly homogeneously distributed diffusers. The production complexity is in this case low. The diffusers may either be admixed to the plastic granulate or be an integral part of the granulate.

The diffusers may also be made of fluorescent material.

PREFERRED EMBODIMENT OF THE INVENTION

Figure 1:
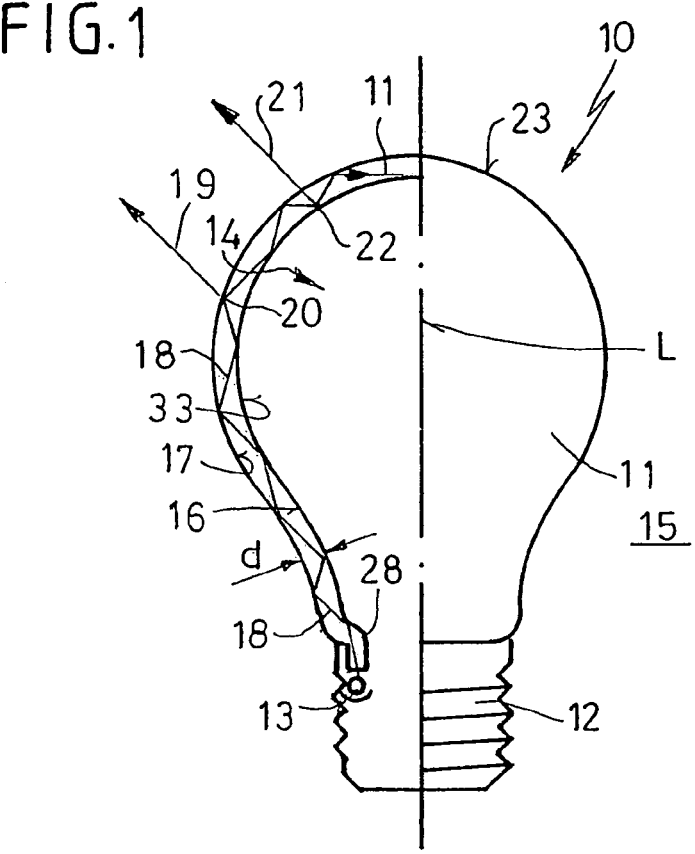
FIG. 1 shows a schematic partially sectioned view of a first exemplary embodiment of a lamp according to the invention having a conventional, bulb-shaped basic form.

FIG. 1 shows a lamp given the overall reference 10, which has a bulb element 11 having a conventional, bulb-shaped or drop-shaped basic form. The bulb element 11 is fixed to a base 12 which is in the form of a screw base and which serves the purpose of mechanically holding, and acting as an electrical connection to, a luminaire-side fitting (not shown).

The bulb element 11 envelops a physical volume 14, which can be, for example, evacuated or else, as an alternative, provided with a gas filling. It is possible to arrange a lamp element of the second type in the physical volume 14 or else outside the physical volume 14. In principle, it is also possible for there to be a direct connection between the physical volume 14 and the outside of the lamp 15, the bulb element 11 and/or the base 12 having air passage openings.

In all of the exemplary embodiments illustrated in the figures, the bulb element 11 is made of a light-conducting material, for example of glass or plastic. It has an inner limit face 16 and an outer limit face 17. The inner limit face 16 represents the side, which faces the bulb element 11 of the limit layer between the bulb element 11 and the volume element 14, and the outer limit face 17 represents the side, which faces the bulb element 11, of the limit layer between the bulb element 11 and the exterior 15.

The bulb element 11 which in the exemplary embodiments is made of a solid material may alternatively also be made of two separate elements, such that the inner limit face 16 is provided by a first element, and the outer limit face 17 is provided by a second element. An airless or gas-filled space can then be provided between the two limit faces, and the diode light propagates through said space.

In the exemplary embodiment according to FIG. 1, only one LED element 13 is illustrated in the region of the base 12, for the sake of clarity. Two or more LED elements 13 are preferably arranged around the longitudinal axis L of the lamp 10 in the region of the base 12 which is essentially circular in cross section such that they are distributed uniformly around the circumference, resulting in the LED elements being arranged essentially in the form of a circular ring.

According to FIG. 1, the LED element 13 irradiates the LED light, along the path of the arrow 18, directly from below into the edge region 28 of the bulb element 11. In the region of the irradiation, care must of course be taken to ensure that as few irradiation losses occur here as possible so as to provide maximum LED light 18 for uniform illumination of the exterior 15 of the lamp.

The LED light propagates along the arrow path 18 in the bulb element 11. Total reflection at the inner and outer limit faces 16, 17 results. The arrow path 18 is merely intended to illustrate schematically the path of the diode light. In fact, an almost infinitely large number of different arrow paths 18 are superimposed on one another.

In the region 20 of the outer limit face 17, the outer limit face 17 is formed in a particular manner. For example, the surface of the outer side 23 may in this case be worked or the outer limit face 17 may have a particular extent, resulting in this case in the LED light 18 emerging from the bulb element 11 into the exterior 15. This is illustrated by the arrow 19. Alternatively, the outer side 23, rather than having its surface worked, may also be provided with a special coating, for example even with fluorescent materials which convert short-wave LED radiation into visible LED light. Finally, it is also possible to produce a corresponding emergence of light owing to the bulb element 11 itself being provided with a corresponding shape.

In a corresponding manner, the inner limit face 16, as is indicated by way of example by the region 22, may also be formed such that part of the LED light is in this case not subject to total reflection on the inner limit face 16 and is not passed on, but emerges from the bulb element 11, for example along the arrow 21 indicated, into the exterior 15.

The limit faces 16, 17 are in this case preferably formed over their entire extent such that all of the LED light fed into the bulb element 11 from all of the LED elements 13 emerges from the bulb element 11 uniformly or at least largely uniformly. In this manner, the bulb element 11 is perceived by a viewer as a largely homogeneous light source without it being possible to distinguish the individual LED elements.

At this point, reference is in particular made to the fact that the design according to the invention of the limit faces 16, 17 can be achieved, for example, by special coatings, or else by working, for example by roughening the material of the bulb element 11. The inner side 33, which faces the physical volume 14, of the bulb element 11 is accessible from the physical volume 14, making it possible for the ready-manufactured bulb element 11 to be worked further for the purpose of influencing the inner limit face 16. Even easier to work are the outer sides 23, which are completely freely accessible, of the outer limit faces 17 which can likewise be coated or worked.

The above-described light emergence corresponding to arrows 19 and 21 is intended merely to schematically illustrate the optical path. In fact, the emergence of light from the bulb element 11 comes about in the region of those regions 20, 22 in which imperfections in the limit faces 16, 17 or imperfection-like inclusions in the bulb element 11 are present. In order to achieve a light distribution of the LED light 18 which is as homogeneous as possible over the entire bulb 11, such regions 20, 22 which contain imperfections are of course distributed not only at certain locations over the bulb element 11, but cover the bulb element 11 almost completely. Merely owing to the density of the imperfections or owing to their formation, it is possible to achieve a largely homogeneous light distribution of the LED light 18 over the entire extent of the bulb element 11.

Finally, it is also conceivable, although more complex, to achieve the desired, uniform light radiation of the LED light 18 from the bulb element 11 by providing the bulb element 11 with a particular shape. For example, the thickness d of the bulb element 11, i.e. the wall thickness of the bulb element 11 or in other words the spacing between the inner limit face 16 and the outer limit face 17, which is constant in the exemplary embodiment shown in FIG. 1, can be varied over the entire extent of the limit faces 16, 17.

Figure 2:
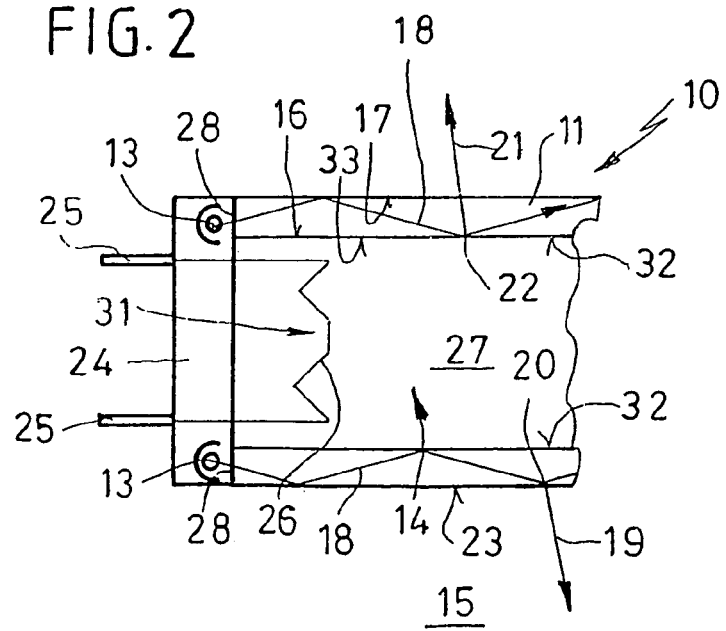
FIG. 2 shows a schematic, broken-away sectional illustration of one end region of a second exemplary embodiment of a lamp according to the invention in the form of a lamp having a base at two ends having two types of lamp element.

FIG. 2 shows a second exemplary embodiment of a lamp 10 according to the invention, which has a base at two ends. It thus has the shape of conventional fluorescent lamps.

At this point reference is made to the fact that identical, comparable or corresponding elements in the different exemplary embodiments are provided with the same reference numerals for better clarity.

FIG. 2 shows merely a broken-away illustration of an end region of this lamp 10 having a base 24 and corresponding connecting contact pins 25. An identical base 24 (not shown) is positioned, with respect to FIG. 2, at the opposite, right-hand end of the lamp 10.

The two bases 24 are connected to a bulb element 11, which is a conventional, hollow-cylindrical basic form having a circular cross section. In the case of conventional fluorescent lamps, the known bulb element is usually made of glass.

The base 24 has an associated incandescent filament 26. A fluorescent layer 32 (which is not illustrated in any more detail) is in this case arranged on the inner side 33, which faces the interior 14, of the bulb element 11.

The incandescent filament 26 having the corresponding connections, the gas 27 and the fluorescent layer 32 together form a lamp element 31 of the second type, which is described in more detail below. In the case of such fluorescent lamps, the bulb element 11 usually acts merely as a protective bulb or serves the purpose of containing the gas 27.

In the case of the lamp 10 according to the invention shown in FIG. 2, the bulb element 11 has, as in the exemplary embodiment shown in FIG. 1, an inner limit face 16 and an outer limit face 17. The bulb element 11 is fixed directly to the base 24, resulting in a fixing region 28 which is essentially in the form of a circular ring. In the exemplary embodiment shown in FIG. 2, a large number of LED elements 13 which are uniformly spaced apart from one another in a circumferential direction are in turn arranged on the base 24, close to the fixing region 28. According to FIG. 2, only two LED elements 13 are shown which feed the LED light along the arrow path 18 into the bulb element 11. The terminals for the LED elements are not shown.

Within the bulb element 11, total reflection at two limit faces 16, 17 in turn results, causing the LED light 18 to propagate along the entire extent of the bulb element 11.

In analogy to the exemplary embodiment shown in FIG. 1, as shown by the arrows 19, 21, the LED light 18 emerges from the bulb element 11 into the exterior 15, which is achieved by the limit faces 16, 17 having a corresponding formation. The working or coating or formation of the bulb element 11 may be carried out for this purpose in the same manner described with respect to FIG. 1.

The exemplary embodiment shown in FIG. 2 thus has lamp elements of the first type, namely the group of LED elements 13. Furthermore, a lamp element 31 of the second type is provided which is at least very similar to a conventional fluorescent lamp.

The two different lamp elements 13 of the first type and lamp elements 31 of the second type can advantageously be driven separately from one another.

For the case in which, as is provided in accordance with FIG. 2, the group of lamp elements 13 of the first type comprises two or more individual elements (LED elements 13), it may also be possible for the individual elements to be driven separately from one another.

It is conceivable, for example, for it to be possible for individual lamp elements to be switched on or off during operation of the respective other lamp element or for at least one of the two lamp elements of the different groups to be designed such that it can be dimmed. This makes possible, for example, an efficient emergency or continuous light from a lamp having a low output power, this light being produced exclusively by LED elements 13. On the other hand, this also makes it possible to alter the overall color temperature for the purposes described in DE 198 29 270 A1.

At this point reference is made to the fact that it is of course possible for a lamp element 31 of the second type (not shown) to be arranged in the physical volume 14 of the first exemplary embodiment shown in FIG. 1. In principle, the lamp element 31 of the second type may in this case initially be any type. It may be, for example, a compact fluorescent lamp. Moreover mention is made of the fact that the bulb element 11 according to the exemplary embodiment shown in FIG. 2 also takes on the function here of a fiberoptic conductor for the LED light 18 as well as the function of a protective bulb. In principle, a separate diffuser element (which is not shown) may also be provided here which envelops the entire arrangement. Finally, it is also conceivable for the two bulb elements to have a particularly concentric arrangement, with one bulb element forming the protective bulb and the other bulb element serving the purpose of passing the LED light 18 on.

Figure 3:
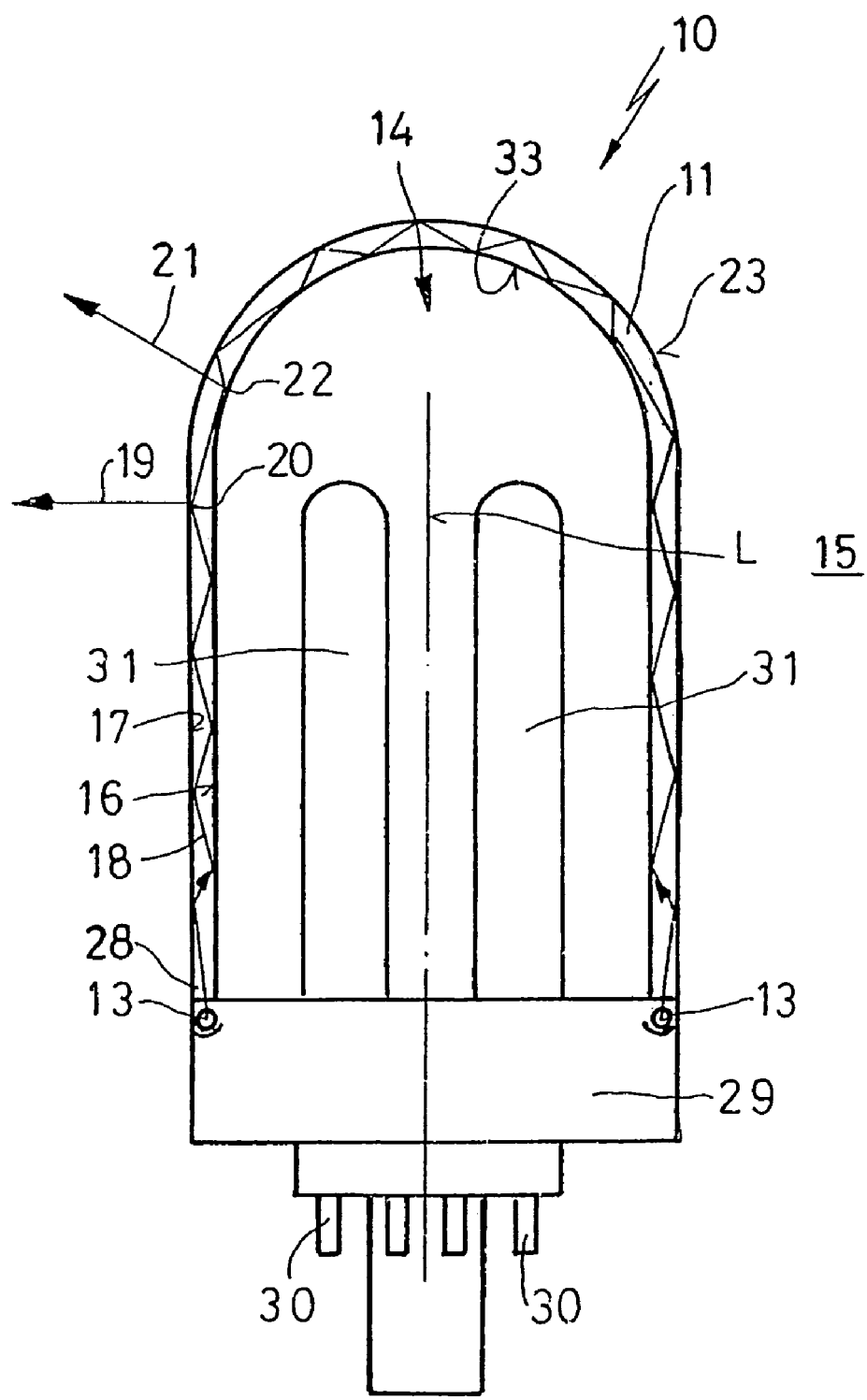
FIG. 3 shows a schematic illustration of a third exemplary embodiment of the invention in the form of a lamp which has a base at one end and has two types of lamp element.

FIG. 3 shows a third exemplary embodiment of the lamp 10 according to the invention having a bulb element 11 which is U-shaped in cross section and is rotationally symmetrical with respect to its longitudinal axis L. The lamp 10 shown in FIG. 3 in turn has a base 29 at only one end. In this case too, the base 29 has corresponding connection elements 30, which serve the purpose of making the mechanical and electrical contact with a luminaire-side fitting (not shown). The embodiments represented by FIGS. 1 and 2 in the same way relate to the exemplary embodiment shown in FIG. 3.

In analogy to the exemplary embodiment shown in FIG. 2, lamp elements 31 of the second type are arranged in the physical volume 14 of the closed bulb element 11 which is fixedly connected to the base 29. LED elements 13 are in turn arranged in the base 29 and are spaced apart from one another distributed in the circumferential direction. The LED elements 13 and the two lamp elements 31 of the second type may, as in the exemplary embodiment shown in FIG. 2, have a different color temperature. This advantageously makes it possible in the same way to solve the object described in DE 198 29 270 A1 of creating a lamp having two lamp elements having a different color temperature, it being possible for the overall color temperature of the lamp to be altered and for the illumination level of the color temperature to be altered. The LED elements 13 in the form of lamp elements of the first type and the lamp elements 31 of the second type which may be in the form of, for example, a compact fluorescent lamp, or else in the form of a high-pressure discharge lamp, may, however, also have the same color temperatures. At least one of the two groups of lamp elements or lamp elements 31, 13 can preferably be dimmed and/or switched on or off.

The light propagation of the LED light 18 takes place in the exemplary embodiment shown in FIG. 3 in analogy to the above-described light propagation.

Figure 4:
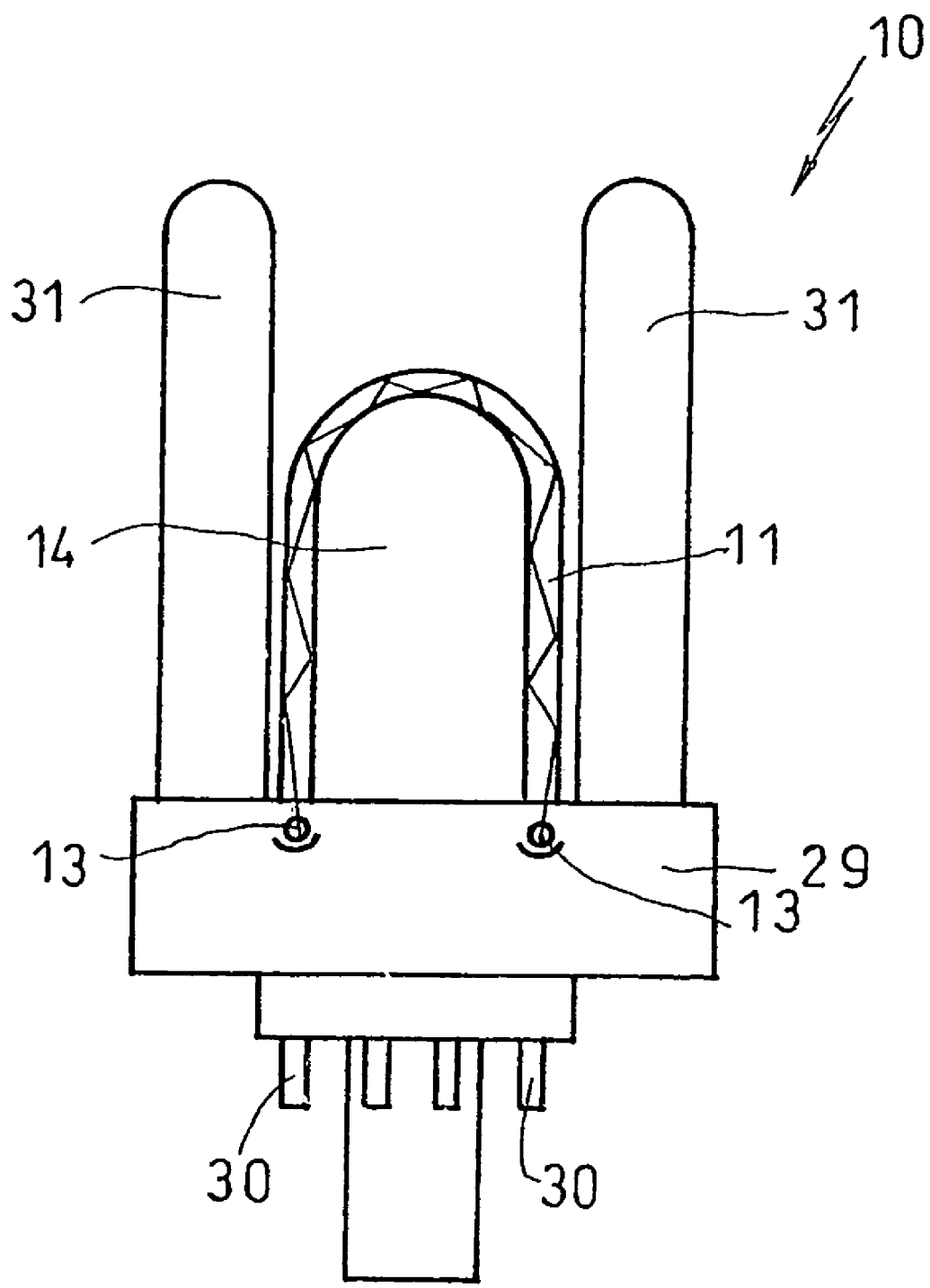
FIG. 4 shows an illustration according to FIG. 3 of a fourth exemplary embodiment of the invention.

The exemplary embodiment shown in FIG. 4 differs from the exemplary embodiment shown in FIG. 3 essentially by the fact that, in this case, the bulb element 11 into which LED light is irradiated is arranged centrally between two lamp elements 31 of the second type. The discharge vessels 31 may in this case naturally have any desired shapes and may comprise, for example, three or four limbs, such as in the case of conventional compact lamps.

An outer element which jointly envelops the bulb 11 and the lamp elements 31, which is in the form of the bulb element 11 in the exemplary embodiment shown in FIG. 3, may be dispensed with in the exemplary embodiment shown in FIG. 4. However, a further, additional diffuser element (not shown in FIG. 4) may also be provided, for example.

The invention claimed is:

1. A lamp (10) having a base at one or both of its ends, a bulb element (11) which envelops a physical volume (14) being arranged on the at least one base (12), and the lamp having at least one associated LED element (13), characterized in that the LED light is irradiated into the bulb element, and, owing to reflection at limit faces (16, 17) of the bulb element, the LED light is passed on within the bulb element.

2. The lamp as claimed in claim 1, characterized in that a lamp element (31) of the second type is arranged within the physical volume (14) and supported by the at least one base.

3. The lamp as claimed in claim 2, characterized in that the lamp element (31) of the second type is in the form of a compact fluorescent lamp.

4. The lamp as claimed in claim 1, characterized in that a lamp element (31) of the second type is provided which has the same color temperature as the LED element (13) and is supported by the at least one base.

5. The lamp as claimed in claim 1, characterized in that the limit faces (16, 17) are curved and have largely no edges.

6. The lamp as claimed in claim 1, characterized in that the physical volume (14) is completely enclosed jointly by the bulb element (11) and the at least one base (12).

7. The lamp as claimed in claim 1, characterized in that at least one LED element (13) is arranged in the at least one base (12) of the lamp.

8. The lamp as claimed in claim 1, characterized in that the bulb element is connected to the at least one base via a fixing region (28), and the at least one LED element is arranged close to the fixing region.

9. The lamp as claimed in claim 1, characterized in that two or more LED elements (13) are provided which are arranged in the region of the edge of the at least one base.

10. The lamp as claimed in claim 1, characterized in that two or more LED elements (13) are provided which are arranged on the base such that they are distributed around the circumference of the base.

11. The lamp as claimed in claim 1, characterized in that two or more LED elements (13) are provided which comprise different colors.

12. The lamp as claimed in claim 1, characterized in that the limit faces comprise an inner limit face (16) which is adjacent to the physical volume (14) and an outer limit face (17) which is adjacent to the exterior, the inner and the outer limit faces being at least partially curved.

13. The lamp as claimed in claim 1, characterized in that the LED light is passed on within the bulb element (11) along the limit faces (16, l7).

14. The lamp as claimed in claim 12, characterized in that the bulb element (11) is essentially hollow, two separate structural elements forming the inner and the outer limit faces.

15. The lamp as claimed in claim 12, characterized in that at least one of the inner limit face and the outer limit face (16, 17) of the bulb element (11) is provided with a fluorescent layer (32), which is stimulated by the LED light.

16. The lamp as claimed in claim 1, characterized in that the lamp (10) has at least one base (12) having a conventional physical shape.

17. The lamp as claimed in claim 1, characterized in that the bulb element (11) is made of plastic.

18. The lamp as claimed in claim 17, characterized in that the bulb element is in the form of a plastic injection-molded part.

19. The lamp as claimed in claim 1, wherein the LED light is passed on within the bulb element along the limit faces largely owing to total reflection on the limit faces.

20. The lamp as claimed in claim 15, wherein the fluorescent layer is stimulated by components of the LED light which are in the short-wave UV range.

* * * * *